Patented Dec. 5, 1922.

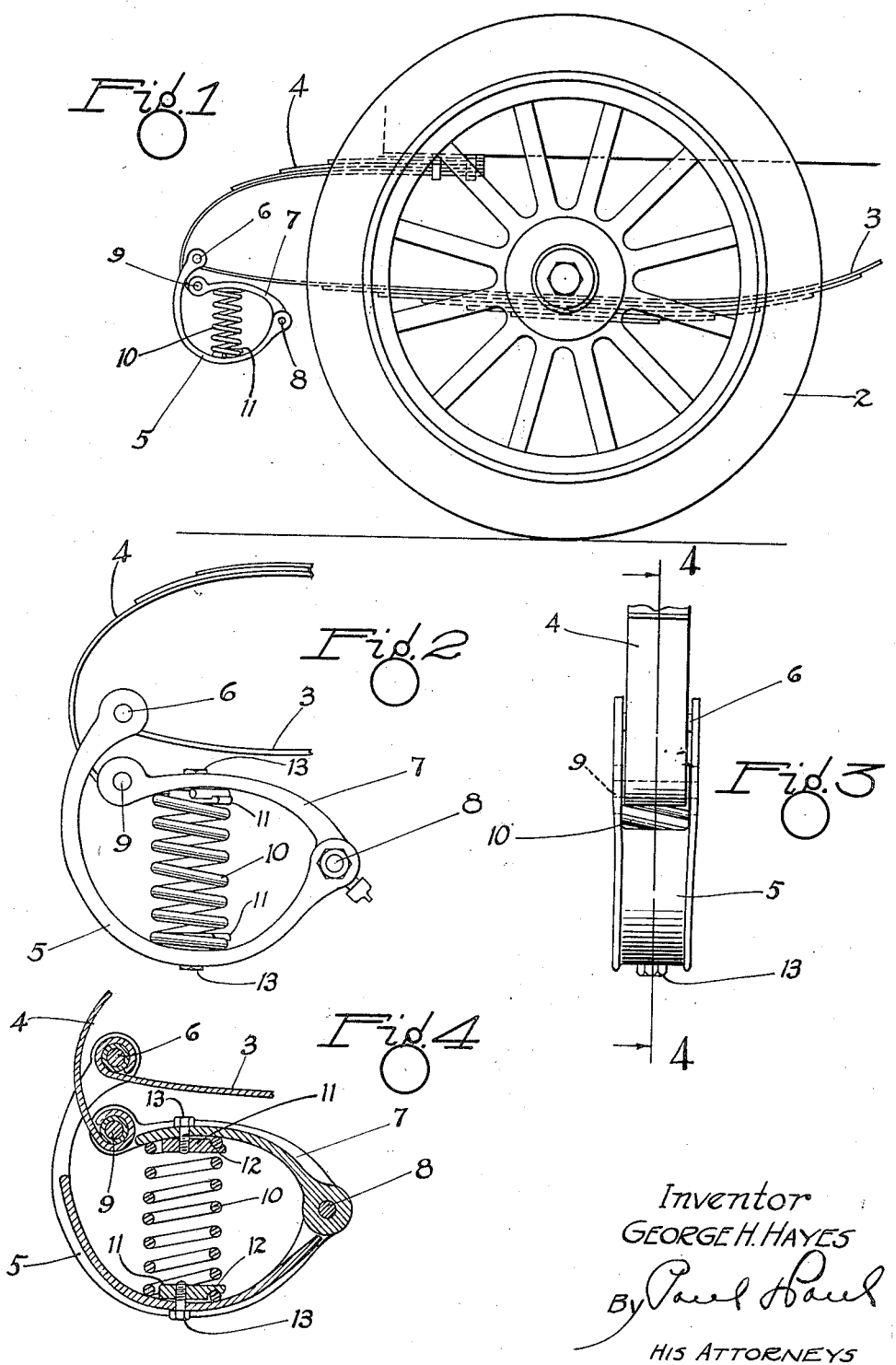

1,437,416

UNITED STATES PATENT OFFICE.

GEORGE H. HAYES, OF ST. PAUL, MINNESOTA.

SHOCK ABSORBER.

Application filed November 23, 1920. Serial No. 425,970.

*To all whom it may concern:*

Be it known that I, GEORGE H. HAYES, a citizen of the United States, resident of St. Paul, county of Ramsey, State of Minnesota, have invented certain new and useful Improvements in Shock Absorbers, of which the following is a specification.

The object of my invention is to provide a device adapted for neutralizing shocks and absorbing vibrations to which the vehicle may be subjected, and the particular object of my present invention is to provide a shock absorbing mechanism adapted to be mounted between one of the vehicle springs that is connected with the axle and a spring section mounted on the body of the vehicle, the elements of the mechanism being so arranged that forward and backward thrust or lurch arising from the dropping of the vehicle wheels into a rut or depression will be taken up or dissipated without shock or injury to the occupants of the vehicle.

A further object is to provide a shock absorbing device which will relieve the vehicle springs of undue or unusual strain thereon occasioned by extreme lurch or vibration of the vehicle body.

The invention consists generally in various constructions and combinations, all as hereinafter described and particularly pointed out in the claims.

In the accompanying drawings forming part of this specification,

Figure 1 is a side view of a rear wheel of a power propelled vehicle and the springs therefor, showing the application of my invention thereto, Figure 2 is a detail view of the device, with the ends of the vehicle springs broken away, Figure 3 is a rear elevation, Figure 4 is a sectional view on the line 4—4 of Figure 3.

In the drawing, 2 represents a wheel of the vehicle, 3 one of the lower springs secured to the axle in the usual way, not shown, and 4 one of the upper springs mounted on the frame of the vehicle, as indicated by dotted lines in Figure 1, and having a backwardly and downwardly turned leaf which normally depends below the corresponding leaf of the spring 3. The construction and arrangement of these springs is common in vehicles of this type and further illustration and description is unnecessary. 5 represents a lever arm, semi-circular in form, substantially, and pivotally connected at its outer end 6 to the spring 3. A second lever arm 7, also preferably curved, is pivotally connected by means of a bolt 8 or other suitable means to the lower inner end of the lever arm 5, while the opposite end of the arm 7 is pivotally connected at 9 to the depending end of the spring 4. Normally, the pivot 6 will be above the pivot 9 and spaced therefrom, as indicated in the figures. When downward pressure is exerted on the vehicle springs, the lever arms and their pivots 6 and 9 will be correspondingly depressed and usually will occupy the same relative position in their different positions of depression.

To resist movement of the lever arms toward each other, I provide a compression spring 10 between them, the ends of the spring being seated on the inner faces of the levers 5 and 7 and disc members 11 being provided, having seats 12 for the end coils of the spring for holding them rigidly against the lever arms, and suitable means, such as bolts 13, are provided for securing the discs to the lever arms. With this device interposed between the upper and lower springs of the vehicle, forward and backward lurch will be compensated for and shock or vibration to the occupants of the vehicle, caused by the sudden dropping of the wheels into a rut or depression will be avoided.

The horizontal pivots connecting the lever arms with each other and with the spring members will also prevent any tendency to lateral lurch or vibration, the parts having freedom of vertical oscillation but being held by the pivots against any tendency to lurch sidewise.

I claim as my invention:

1. The combination, with the upper and lower vehicle springs, of lever arms pivotally connected together at one end, the opposite ends of said lever arms being pivotally connected respectively to said springs, and a compression spring interposed between said lever arms one of said lever arms having an opening through which the vehicle spring connected to the other lever arm extends.

2. The combination, with upper and lower vehicle springs, of a lever arm, semi-circular substantially in form, pivotally connected at one end to one of said springs, a second lever arm pivotally connected at one end to the other spring and having its opposite ends pivotally connected with the adjacent end of said other lever arm, the pivotal connections of said arms with said springs being one above the other and normally spaced apart, and a compression spring interposed between said lever arms one of said lever arms being included between the ends of the other arm.

3. The combination, with a lower vehicle spring, of an upper spring having an outwardly and downwardly curved end depending below the normal level of the corresponding end of the lower spring and adjacent thereto, a curved lever arm pivotally connected at its upper end to the lower vehicle spring, a second arm pivotally connected to the lower end of the upper spring below the pivot of said first named arm, said arms projecting inwardly toward the vehicle wheel and having their adjacent inner ends pivotally connected together, and a compression spring interposed between said arms said curved lever arm having an opening therein through which the downwardly curved end of said upper spring extends.

4. A spring shackle comprising a member having one end for connection with a vehicle axle spring, a second member having one end pivotally connected with the other end of said first named member, a body spring connected with the free end of said second member, one of said members having an opening therein through which the spring connected with the other member extends and in which it is movable, and a compression spring interposed between said members.

5. A spring shackle comprising a substantially semi-circular member and a substantially straight member pivotally connected to each other at one end, said substantially straight member being included between the ends of said semi-circular member, spring sections pivotally connected with said members, and a compression spring interposed between said members.

6. The combination, with upper and lower vehicle springs, of a lever arm having a forked end to straddle the upper spring and pivotally connected with the lower spring, a second lever arm pivotally connected at one end with the corresponding end of said first named lever arm and pivotally connected with the upper spring at a point near the fork in said first named arm, and a compression spring interposed between said lever arms.

In witness whereof, I have hereunto set my hand this 18th day of November, 1920.

GEORGE H. HAYES.